United States Patent [19]

Doi et al.

[11] 4,351,876
[45] Sep. 28, 1982

[54] LAMINATE FILMS AND SHEETS OF CROSSLINKED POLYETHYLENE RESINS

[75] Inventors: Shuhei Doi; Tsutomu Isaka, both of Yokkaichi; Shinichiro Iida, Mie, all of Japan

[73] Assignee: Mitsubishi Petrochemical Company Limited, Japan

[21] Appl. No.: 217,460

[22] Filed: Dec. 17, 1980

[30] Foreign Application Priority Data

Dec. 27, 1979 [JP] Japan .................................. 54/173641

[51] Int. Cl.³ ........................ B32B 27/06; B32B 27/28; B32B 15/08; B32B 27/08
[52] U.S. Cl. .................................. 428/349; 428/35; 428/246; 428/248; 428/261; 428/282; 428/286; 428/290; 428/429; 428/443; 428/446; 428/447; 428/450; 428/452; 428/411; 428/483; 428/509; 428/513
[58] Field of Search ............... 428/447, 349, 483, 248, 428/261, 286, 246, 282, 290, 441, 429, 446, 461, 450, 452, 513, 509, 411, 443, 35

[56] References Cited
U.S. PATENT DOCUMENTS 3,225,018 12/1965 Zutty .................................. 525/326
3,306,800 2/1967 Plueddeman ......................... 525/106
4,237,334 12/1980 Kojima ................................ 428/447

FOREIGN PATENT DOCUMENTS 56-11246 2/1981 Japan .................................. 428/447

Primary Examiner—Ellis P. Robinson
Attorney, Agent, or Firm—Robert E. Burns; Emmanuel J. Lobato; Bruce L. Adams

[57] ABSTRACT

A laminate film or sheet of crosslinked polyethylene resin has as an outer layer a resin layer comprising a copolymer of ethylene and an ethylenically unsaturated silane compound which has been crosslinked by the contact thereof with moisture and has a gel content of 5 percent or more, and possesses excellent processing stability during its lamination, almost no odor, and, simultaneously, heat resistance and heat sealability.

8 Claims, 4 Drawing Figures

LAMINATE FILMS AND SHEETS OF CROSSLINKED POLYETHYLENE RESINS

BACKGROUND OF THE INVENTION

This invention relates generally to laminate films and sheets and more particularly to laminate films and sheets each having a layer of a polyethylene resin having simultaneously heat resistance and heat sealability.

The practice of laminating (uncrosslinked) polyethylene resins onto papers, cellophane, aluminum foil, synthetic resin films and sheets, and the like in order to impart heat sealability thereto, particularly in the food-packaging field, has been known in the prior art. However, the heat resistance of an (uncrosslinked) polyethylene resin is deficient with respect to conditions of ever-increasing severity in the food packaging field, for example, such as the recent trend toward the elevation of sterilization temperatures and the increase in speeds of automatic filling of packages with food. Consequently, an (uncrosslinked) polyethylene resin cannot be made to meet the recent requirements by techniques known in the present art.

For example, a packaging pouch or bag can be made from laminated sheets each having an (uncrosslinked) polyethylene layer by bringing the sheets with their polyethylene layers constituting their inner surfaces and heat sealing these surfaces together to form the bag. When this bag is filled with an article to be packaged and, in that state, is subjected to a sterilization process by boiling, or when the bag is used in an automatic filling and packaging operation wherein the article to be packaged is placed in the bag immediately after heat sealing, the heat-sealed parts tend to delaminate or be peeled away from each other, or the edges tend to be torn.

On one hand, the measure of crosslinking an (uncrosslinked) polyethylene resin thereby to improve its properties such as heat resistance is a common practice and is effective in the production of various formed articles. In the crosslinking methods practiced at present, however, while properties such as heat resistance can be improved, it is impossible to avoid a lowering of the heat sealability. For example, Japanese Pat. Publn. No. 1711/1972 discloses a method wherein crosslinkable polyethylene obtained by grafting an ethylenically unsaturated silane compound onto polyethylene is crosslinked by causing it to contact moisture in the presence of a silanol condensation catalyst. This method has attracted attention in recent years as a crosslinking method since it does not require special and expensive crosslinking equipment as in the conventional method depending on a peroxide and that depending on radiation. However, in this method, also, similarly as in the conventional methods, the crosslinked product does not exhibit heat sealability. Furthermore, the processing stability of this substance at the time of lamination with another material is poor, and this substance is also not satisfactory with respect to its odor.

SUMMARY OF THE INVENTION

In view of the present state of the art as described above, it is an object of this invention to provide laminate films and sheets which have excellent processing stability at the time of lamination, are odorless, and, moreover, possess simultaneously heat resistance and heat sealability.

According to this invention, briefly summarized, there are provided laminate film or sheet having as an outer layer a layer of a resin comprising a copolymer of ethylene and an ethylenically unsaturated silane compound which has been crosslinked by the contact thereof with moisture and which has a gel content of 5 percent or more.

The nature, utility, and further features of this invention will be more clearly apparent from the following detailed description beginning with a consideration of general aspects of the invention and concluding with a specific example and comparison examples.

DETAILED DESCRIPTION OF THE INVENTION

Figure 1:
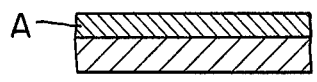
FIGS. 1, 2, and 3 are greatly enlarged, fragmentary, sectional views respectively showing the laminated structures of examples of two-ply, three-ply, and six-ply laminate films or sheets according to this invention, layers of a crosslinked copolymer of ethylene and an ethylenically unsaturated silane compound being designated by reference character A.

The term "ethylenically unsaturated silane compound" is herein used to designate a silane compound represented by the formula $RSiR'_n Y_{3-n}$, wherein: R is an ethylenically unsaturated hydrocarbon group or hydrocarbonoxy group having, for example, 2 to 8 carbon atoms; R' is an aliphatic saturated hydrocarbon group having, for example, 1 to 14 carbon atoms; Y represents a hydrolyzable organic group such as an alkoxy group, acyloxy group or hydrocarbylamino group; and n is zero, 1, or 2.

Specific examples of R are vinyl, allyl, isopropenyl, butenyl, cyclohexenyl, and γ-(meth)acryloyloxypropyl. "(meth)acryloyloxypropyl" means acryloyloxypropyl or methacryloyloxypropyl. Specific examples of R' are methyl, ethyl, propyl, decyl, and phenyl. Specific examples of Y are methoxy, ethoxy, formyloxy, acetoxy, propionyloxy, and alkyl- or arylamino. Preferred unsaturated silane compounds are represented by the following formulas.

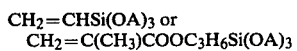

$$CH_2=CHSi(OA)_3 \text{ or}$$
$$CH_2=C(CH_3)COOC_3H_6Si(OA)_3$$

wherein A is a hydrocarbyl group having 1 to 8 carbon atoms and more preferably 1 to 4 carbon atoms.

The most preferred silane compounds include vinyltrimethoxysilane, vinyltriethoxysilane and γ-methacryloyloxypropyltrimethoxysilane.

The copolymerization of the ethylene and the above mentioned unsaturated silane compound is carried out by causing the two monomers to contact each other simultaneously or stepwise in an autoclave or a tube reactor, preferably in an autoclave, under the conditions, for example, as disclosed in U.S. Pat. No. 3,225,018, of a pressure of 500 to 4,000 kg/cm², preferably 1,000 to 4,000 kg/cm², and a temperature of 100° to 400° C., preferably 150° to 350° C., in the presence of a radical polymerization initiator known to be useable for homopolymerization or copolymerization of ethylene and, if necessary, of a chain transfer agent. In this case, vinyl acetate, (meth)acrylic acid, esters thereof, or derivatives thereof may be further copolymerized.

The copolymer used in this invention has a content of the ethylenically unsaturated silane compound unit of 0.001 to 5 percent, preferably 0.01 to 3 percent, particularly preferably 0.05 to 2 percent, all percentages being by weight. We have found that when this content is less than 0.001 percent, the heat resistance of the crosslinked product is deficient. On the other hand, when this content exceeds 5 percent, the heat sealability of the crosslinked product disappears.

To the copolymer of the ethylene and the unsaturated silane compound are added thermoplastic resins which can be mixed therewith, a stabilizer, a lubricant, a filler, a coloring agent, a foaming agent, and other auxiliary materials as necessary. Then, by means of suitable blending means generally used for thermoplastic resins such as, for example, an extruder, the mixture is melt-extruded and formed into a resin layer as a film or sheet.

As films or sheets with which the above described resin layers are laminated, those conventionally used in laminate films or sheets with (uncrosslinked) polyolefins are generally useable. Examples are: films or sheets of resins such as saturated polyesters, polyamides, saponified products of ethylene-vinyl acetate copolymers, polyolefins, polystyrenes, polyvinyl chlorides, polyvinylidene chlorides, and acrylic resins; foils and sheets of metals such as aluminum, iron, and copper; and other materials such as paper, cellophane, fabrics, glass in sheet form of fibrous form, and asbestos. The above enumerated resin films and sheets can be stretched, blown or foamed, or woven.

The lamination of the layer of the above described laminate material and the aforementioned resin layer is carried out by any of generally practiced methods such as dry lamination and wet lamination wherein adhesives may be used between the two layers, and extrusion coating, sandwich lamination, coextrusion, etc. When necessary, the adhesive strength between the layers can be increased by providing an anchor-coat layer between the layers. In general, it can be said that a preferable lamination method comprises a process step in which a resin composition comprising the copolymer of ethylene and the ethyenically unsaturated silane compound is melted. A method of this character is particularly suitable with respect to resin compositions containing this copolymer. The reason for this is that, in comparison with the case of other known crosslinkable polymers obtainable by graft polymerizing an ethylenically unsaturated silane compound onto a polyethylene, there is less tendency of this copolymer being scorched in the melting process step.

The crosslinking of the resin layer comprising the copolymer of the ethylene and the ethylenically unsaturated silane compound is carried out by causing this resin layer to contact moisture in the presence of a silanol condensation catalyst.

For this silanol condensation catalyst, such compounds as dibutyltin dilaurate, dibutyltin diacetate, and dibutyltin dioctoate are available as disclosed in the aforecited Japanese patent publication. This silanol condensation catalyst is used by blending it beforehand in the above mentioned copolymer or by applying it as a solution or dispersion as a coating on the resin layer or causing it to impregnate the resin layer. The quantity in which this silanol condensation catalyst is used, in general, is 0.0001 to 5 percent, preferably, 0.001 to 3 percent, particularly 0.01 to 1 percent, all percentages being by weight, as proportions based on the total weight of the catalyst and the copolymer.

The crosslinking of the resin layer containing the silanol condensation catalyst is carried out by causing contact between the resin layer and moisture. More specifically, the resin layer is caused to contact water (in liquid or vapor state) at a temperature between room temperature and 200° C., ordinarily room temperature to 100° C., for a period between 10 seconds to 1 week, ordinarily of the order of 1 minute to 1 day. Furthermore, this crosslinking can be carried out after lamination of the resin layer with the laminate material, of course, and also prior to or simultaneously with the lamination.

The gel content of the resin layer according to this invention is required to be 5 percent or higher for imparting good properties such as heat resistance and be 90 percent or lower for imparting heat sealability. The most preferable gel content is between 15 and 85 percent. Here, the gel content is the ratio, expressed in percentage, of the quantity of the fraction remaining undissolved after 10 hours of extraction of the crosslinked resin by boiling xylene by means of a Soxhlet extractor to the weight of the cross-linked resin prior to extraction.

The laminate film or sheet of this invention formed in the above described manner may be of any construction provided that it has as an outer layer a resin layer comprising the copolymer of ethylene and the ethylenically unsaturated silane compound which has been cross-linked by moisture. Specific examples, wherein said resin layer is designated by A, are: two-ply laminated structures such as polyethylene terephthalate/A, nylon/A, polypropylene/A, polyvinyl chloride/A, aluminum/A, paper/A, and cellophane/A; three-ply laminated structures such as polyethylene terephthalate/polypropylene/A, nylon/polypropylene/A, polyethylene terephthalate/saponified ethylene-vinyl acetate copolymer/A, polypropylene/saponified ethylene-vinyl acetate copolymer/A, polyethylene terephthalate/aluminum/A, polypropylene/aluminum/A, polyethylene terephthalate/cellophane/A, and cellophane/nylon/A; and other laminated structures such as polyethylene terephthalate/aluminum/polypropylene/A, polyethylene terephthalate/A/aluminum/A, A/paper/A/aluminum/A, and nylon/A/aluminum/A/polypropylene/A.

Figure 2:
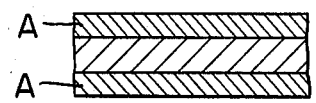
Figure 3:
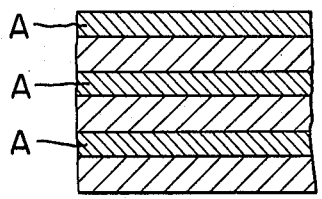
Figure 4:
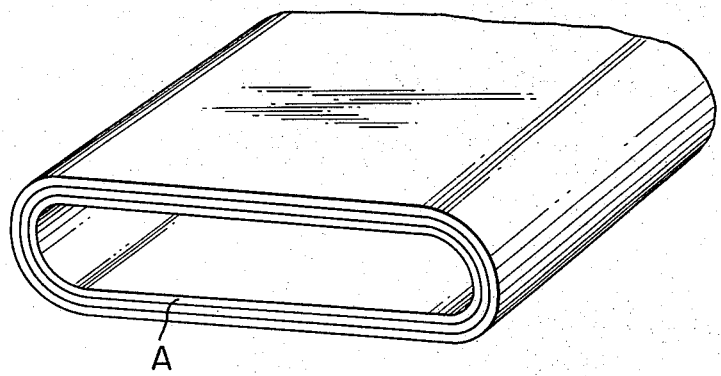
FIG. 4 is a fragmentary perspective view of an example of a laminate film or sheet according to this invention in tubular form.

Examples of two-ply, three-ply, and six-ply laminated structures are illustrated respectively in FIGS. 1, 2, and 3. An example of a three-ply film or sheet according to this invention in tubular form is shown in FIG. 4.

In the above enumerated examples of laminated structures, the polyethylene terephthalate, nylon, polypropylene, etc., are in stretched state in some cases, and, furthermore, the nylon, polypropylene, cellophane, etc., are coated with polyvinylidene chloride in some cases.

In order to indicate more fully the nature and utility of this invention, the following specific example of practice thereof and comparison examples are set forth, it being understood that these examples are presented as illustrative only and are not intended to limit the scope of the invention.

EXAMPLE

Into an autoclave of 1.5-liter capacity provided with an agitator were supplied ethylene at a rate of 43 kg/hr, vinyl trimethoxysilane at a rate of 27 g/hr, and propylene as a chain transfer agent at a rate of 600 liters/hr, and t-butyl peroxyisobutyrate was added as a polymerization initiator at a rate of 1.9 g/hr. With these materials thus supplied, and under the conditions of a pressure of 2,400 kg/cm² and a temperature of 220° C., an ethylene-vinyltrimethoxysilane copolymer of a melt flow rate of 4.2 g/10 min. and a vinyltrimethoxysilane content of 0.1 percent by weight was continuously produced.

This copolymer was extruded by means of a laminator of a 90-mm diameter of an inner Dickel die at a temperature of 315° C. to a thickness of 30 microns and was laminated with a polyethylene terephthalate film of 12-micron thickness by using an isocyanate-base anchor coating agent. The lowering of the melt flow rate of the above mentioned copolymer after lamination was comparable to that of a low-density polyethylene which has not yet been modified as indicated in the following table, and the processability at the time of lamination was stable. Furthermore, the laminated film was almost completely odorless.

Next, a 10 percent by weight solution of dibutyltin dilaurate in xylene was applied as a coating on the copolymer surface of this laminate film, which was then left for one week in a constant-temperature constant-humidity chamber at 40° C. and 80 percent relative humidity to cause crosslinking. Two crosslinked polyethylene resin laminate films thus obtained were so mutually superposed that their crosslinked polyethylene resin surfaces contacted each other. Then, by means of a heated-plate heat-seal testing machine, these superposed films were heat sealed at sealing temperatures at 140°, 160°, 180°, and 200° C., under a sealing pressure of 2 kg/cm², for 1 second to prepare respective test pieces each having a seal width of 2 cm and seal length of 10 cm. The 90-degree peeling strength of the sealed part of each test piece was measured by means of a Schopper testing machine at a pulling speed of 500 mm/min.

Furthermore, sample pouches each measuring 200×150 mm were fabricated by heat sealing (at 180° C. and 1 kg/cm²) the edge portions of the laminated sheets with their crosslinked polyethylene resin surfaces on the inside. 200 cc of salad oil was placed in each pouch, which was then immersed for 30 or 60 minutes in boiling water. The peeling strength of the sealed part of each pouch was then measured.

In addition, strip-shaped samples of 25-mm width were made from the laminate film. One end of each sample was fixed, and a 27-g load was applied to the other end. Then, with the sample in this state, it was folded so that the crosslinked polyethylene resin surfaces contacted each other, and heat sealing was carried out along 15 mm in the longitudinal direction with a pressure of 1 kg/cm² for 0.5 second. Immediately thereafter, by lifting the heat-sealing bar, a peeling force due to the load was applied at an angle of approximately 90 degrees. The length of peeling or delamination of the seal part (hot tackiness) at this time was measured for samples prepared at various sealing temperatures. The results of the various measurements described above are set forth in the following table.

As a further experiment, 2.0 percent by weight of vinyltrimethoxysilane and 0.2 percent by weight of t-butylperoxy-2-ethylhexanoate were blended with low-density polyethylene ("Yukalon YK-50" produced by Mitsubishi Petrochemical Company) of a melt flow rate of 4.0 g/10 min. and a density of 0.924 g/cm³. Then, by means of a 50-mm diameter extruder of an L/D ratio of 24, the mixture was extruded at a temperature of 200° C. to produce vinyltrimethoxysilane-grafted polyethylene, which was used to carry out lamination by the same method as described hereinbefore.

It was found that the melt flow rate after lamination had been greatly lowered, and the process at the time of lamination was not stable. Furthermore, the laminate film emitted a very strong odor. Then, by the same procedure as described hereinabove, crosslinking was carried out, and various physical properties were measured. The results are designated as those of Comparison Example 1 in the following table. In addition, by using an unmodified low-density polyethylene ("Yukalon LK-30") of a melt flow rate of 4 g/10 min. and a density of 0.918 g/cm³, lamination was carried out by the same procedure described above, and the various measurements were made. The results, designated as those of Comparison Example 2, are also shown in the following table.

|  |  | Example | Comp. Ex. 1 | Comp. Ex. 2 |
|---|---|---|---|---|
| Gel content (%) |  | 59 | 60 | 0 |
| MFR (g/10 min.) before and after lamination | Before | 4.2 | 4.0 | 4.0 |
|  | After | 1.8 | 0.2 | 2.2 |
| Peeling strength (resistance) (g/2cm) | 140° C. | 3,720 | 650 | 3,350 |
|  | 160° C. | 3,510 | 780 | 3,510 |
|  | 180° C. | 3,560 | 880 | 3,840 |
|  | 200° C. | 3,590 | 960 | 3,880 |
| Peeling strength after boiling treatment (g/2cm) | Original | 3,440 | 850 | 3,080 |
|  | 30 min. treatment | 3,000 | 690 | 1,680 |
|  | 60 min. treatment | 2,740 | 640 | 990 |
| Peeling length immediately after heat sealing (mm) (hot tackiness) | 120° C. | 15.0 | 15.0 | 15.0 |
|  | 130° C. | 9.0 | 15.0 | 9.0 |
|  | 140° C. | 2.0 | 11.5 | 3.5 |
|  | 150° C. | 2.0 | 8.5 | 2.5 |
|  | 170° C. | 2.5 | 9.0 | 3.0 |
|  | 190° C. | 3.0 | 9.5 | 5.0 |
|  | 210° C. | 4.0 | 10.5 | 7.5 |
|  | 230° C. | 11.0 | 12.5 | 14.0 |
|  | 250° C. | 15.0 | 15.0 | 15.0 |

As described above, the laminate films and sheets of crosslinked polyethylene resin according to this invention have excellent processing stability at the time of high-temperature lamination, are odorless, and have heat resistance since the polyethylene is crosslinked.

In addition, since these laminate films and sheets have heat sealabilities comparable to that of uncrosslinked polyethylene, they are highly useful as various materials, particularly as materials for packaging foods.

What is claimed is:

1. A laminate film or sheet comprising a plurality of laminate layers selected from films or sheets of resins, foils or sheets of metals, paper, cellophane, fabric, glass in sheet or fibrous form and asbestos, in which at least one surface layer among said plurality of laminate layers comprises a heat sealable crosslinked polyethylene copolymer formed by copolymerizing ethylene monomer and an ethylenically unsaturated silane compound so that said copolymer contains about 0.001 to 5 percent by weight of said silane compound and then crosslinking the resultant copolymer by contact with moisture in the presence of a silanol condensation catalyst, whereby the crosslinked copolymer has a gel content of 5 percent or more.

2. The laminate film or sheet as claimed in claim 1 in which the ethylenically unsaturated silane compound is selected from the group consisting of:

$CH_2=CHSi(OA)_3$ and $CH_2=C(CH_3)COOC_3H_6Si(OA)_3$ wherein A is a hydrocarbyl group having 1 to 8 carbon atoms.

3. The laminate film or sheet as claimed in claim 1 or 2 in which the laminate comprises a film or sheet of a material selected from the group consisting of resins, metals, papers, and cellophane.

4. A laminate film according to claim 1 in which the ethylenically unsaturated silane compound has the formula $CH_2=CHSi(OA)_3$, wherein A is a hydrocarbyl group having 1 to 8 carbon atoms.

5. A laminate film according to claim 1 in which the ethylenically unsaturated silane compound has the formula $CH_2=C(CH_3)COOC_3H_6Si(OA)_3$, wherein A is a hydrocarbyl group having 1 to 8 carbon atoms.

6. A laminate film according to claim 1 or 2 in which said copolymer contains about 0.05 to 2 percent by weight of said ethylenically unsaturated compound.

7. In a laminate film or sheet composed of a plurality of laminate layers selected from films or sheets of resin, foils or sheets of metal, paper, cellophane, fabric, glass in sheet or fibrous form and asbestos, the improvement wherein at least one outer layer of said laminate comprises a heat sealable crosslinked ethylene copolymer formed by copolymerizing ethylene monomer and an ethylenically unsaturated silane compound so that said copolymer contains about 0.001 to 5 percent by weight of said silane compound and then crosslinking the resultant copolymer by contact with moisture in the presence of a silanol condensation catalyst, whereby the crosslinked copolymer has a gel content of 5% or more.

8. A laminate film or sheet according to claim 1 or 7 in which said crosslinked copolymer has a gel content of about 15 to 85%.